(12) United States Patent
Saga et al.

(10) Patent No.: US 8,293,831 B2
(45) Date of Patent: Oct. 23, 2012

(54) THERMOPLASTIC COMPOSITION INCLUDING THERMALLY CONDUCTIVE FILLER AND HYPERBRANCHED POLYESTERAMIDE

(75) Inventors: Yuji Saga, Utsunomiya (JP); Wei W. Zhang, Zhangjiang Hi-Tech Park (CN)

(73) Assignee: E I du Pont de Nemours and Company, Wilmington, DE (US)

( * ) Notice: Subject to any disclaimer, the term of this patent is extended or adjusted under 35 U.S.C. 154(b) by 83 days.

(21) Appl. No.: 12/582,758

(22) Filed: Oct. 21, 2009

(65) Prior Publication Data

US 2010/0113668 A1    May 6, 2010

Related U.S. Application Data

(60) Provisional application No. 61/197,792, filed on Oct. 30, 2008.

(51) Int. Cl.
*C08K 3/16* (2006.01)

(52) U.S. Cl. ........ 524/462; 524/420; 524/429; 524/432; 524/433; 524/495; 524/496

(58) Field of Classification Search .................. 525/420, 525/425; 524/436, 492–494, 538, 420, 429, 524/430, 432, 433, 462, 495, 496
See application file for complete search history.

(56) References Cited

U.S. PATENT DOCUMENTS

| | | | |
|---|---|---|---|
| 6,225,404 B1 * | 5/2001 | Sorensen et al. | 525/54.1 |
| 6,387,496 B1 * | 5/2002 | Van Benthem et al. | 428/402 |
| 7,375,165 B2 * | 5/2008 | Sassi et al. | 525/420 |
| 2003/0220450 A1 * | 11/2003 | Dillon et al. | 525/191 |
| 2005/0176835 A1 * | 8/2005 | Kobayashi et al. | 521/56 |
| 2005/0222376 A1 * | 10/2005 | Sassi et al. | 528/310 |
| 2006/0211822 A1 * | 9/2006 | Varlet et al. | 525/165 |
| 2008/0015303 A1 * | 1/2008 | Eibeck et al. | 524/537 |
| 2009/0130471 A1 * | 5/2009 | Saga | 428/477.7 |
| 2010/0113669 A1 * | 5/2010 | Saga et al. | 524/404 |

FOREIGN PATENT DOCUMENTS

| | | |
|---|---|---|
| EP | 0190001 | 6/1989 |
| EP | 0196194 | 12/1989 |
| EP | 1424360 | 6/2004 |
| EP | 0902803 | 9/2004 |
| WO | 98/00460 | 7/1997 |
| WO | 99/16810 | 4/1999 |

OTHER PUBLICATIONS

Froehling, P. Journal of Polymer Science: Part A, Polymer Chemistry, vol. 42, p. 3110-3115, 2004.*
International Search Report, PCT/US2009/061869, Jun. 7, 2010.

* cited by examiner

*Primary Examiner* — Peter Szekely

(57) ABSTRACT

Disclosed is a thermoplastic composition including at least one semi-aromatic polyamide having a glass transition equal to or greater than 100° C. and a melting point of equal to or greater than 280° C.; a thermally conducting filler having a thermal conductivity of at least 5 W/mK, for instance $CaF_2$ powder; and at least one hyperbranched polyesteramide having terminal hydroxy groups; and molded articles made therefrom.

10 Claims, No Drawings

THERMOPLASTIC COMPOSITION INCLUDING THERMALLY CONDUCTIVE FILLER AND HYPERBRANCHED POLYESTERAMIDE

CROSS REFERENCE TO RELATED APPLICATIONS

This application claims the benefit of U.S. Provisional Application No. 61/197,792, filed Oct. 30, 2008, which is incorporated herein by reference in its entirety.

FIELD OF INVENTION

The present invention relates to a thermoplastic composition including a semiaromatic polyamide, thermally conducting filler, and a hyperbranched polyesteramide, the composition having low melt viscosity and high thermal stability.

BACKGROUND OF INVENTION

Engineering thermoplastic plastics are widely used in automotive, electric/electronic, and industrial applications due to high strength, high stiffness, and high heat stability. Particular applications in the automotive markets require moldable thermoplastics that have the mechanical properties and heat stability comparable to metals, high thermal conductivity, and good moisture stability. Providing high thermal conductivity in thermoplastic compositions typically requires high loading of thermally conducting fillers. Unfortunately high levels of fillers often lead to high viscosity compositions that are difficult to mold, especially were fine details are required. Conventional viscosity modifiers such as organic acids, and low viscosity resins, such as polyamide 6,6, are known to reduce melt viscosity when used as additives. However, these materials also lead to undesirable decreases in moisture resistance and physical properties.

Hyperbranched polymers have been disclosed as viscosity modifiers for thermoplastic resins. European Patent 0902803, for instance discloses hyperbranched polyesters. Although these hyperbranched polyesters exhibit good thermal stability in thermo-gravimetric analysis (TGA) alone; in thermoplastic compositions including high melting ($\geq 280°$ C.) semiaromatic polyamides, and thermally conducting fillers, thermal stability is surprisingly lacking.

Needed are molding compositions having high flow (low viscosity) and high thermal stability at processing temperatures $\geq 280°$ C., that exhibit high thermal conductivity and good heat and moisture resistance in molded parts.

SUMMARY OF INVENTION

One embodiment of the invention is a thermoplastic composition, comprising:
  a) from about 10 to about 79.9 wt % of at least one semi-aromatic polyamide having a glass transition equal to or greater than 100° C. and a melting point of equal to or greater than 280° C., as determined with differential scanning calorimetry at a scan rate of 20° C./min;
  b) from about 20 to about 80 wt % of a thermally conducting filler having a thermal conductivity of at least 5 W/mK; and
  c) from about 0.1 to about 10 wt % of at least one hyperbranched polyesteramide having terminal hydroxyl groups.

Another embodiment of the invention is a molded article comprising the composition as disclosed above.

Another aspect of the invention is a thermoplastic composition comprising components (a), (b) and (c) as defined above, wherein the thermoplastic plastic composition has a melt viscosity at 320° C., as measured as disclosed below; at least 10% lower, and preferably at least 30% lower, than that of a composition comprising components (a) and (b) and no component (c).

DETAILED DESCRIPTION OF INVENTION

The semi-aromatic thermoplastic polyamides useful in the invention are one or more homopolymers, copolymers, terpolymers, or higher polymers that are derived from monomers containing aromatic groups. Examples of monomers containing aromatic groups are terephthalic acid and its derivatives, isophthalic acid and its derivatives, p-xylylenediamine and m-xylylenediamine. It is preferred that about 5 to about 75 mole percent of the monomers used to make the aromatic polyamide used in the present invention contain aromatic groups, and more preferred that about 10 to about 55 mole percent of the monomers contain aromatic groups.

The semi-aromatic aromatic polyamide may be derived from dicarboxylic acids or their derivatives, such one or more of adipic acid, sebacic acid, azelaic acid, dodecanedoic acid, terephthalic acid, isophthalic acid or their derivatives and other aliphatic and aromatic dicarboxylic acids and aliphatic $C_6$-$C_{20}$ alkylenediamines, aromatic diamines, and/or alicyclic diamines. Preferred diamines include hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane; and m-xylylenediamine. It may also be derived from one or more lactams or amino acids such as 11-aminododecanoic acid, caprolactam, and laurolactam.

The semi-aromatic polyamides useful in the invention have a glass transition equal to or greater than 100° C., preferably greater than 125° C.; and a melting point of equal to or greater than 280° C., and preferably greater than 290° C. The glass transition and melting points defined herein are determined using differential scanning calorimetry at a scan rate of 20° C./min. The glass transition is defined as the mid-point of the transition in the second heating cycle. The melting point is defined as the point of maximum endotherm in the melting transition in the second heating cycle.

In one embodiment of the invention the semiaromatic polyamide is selected from the group consisting of poly(decamethylene terephthalamide) (polyamide 10,T), poly(nonamethylene terephthalamide) (polyamide 9,T), hexamethylene terephthalamide/2-methylpentamethylene terephthalamide copolyamide (polyamide 6,T/D,T); hexamethylene adipamide/hexamethylene terephthalamide/hexamethylene isophthalamide copolyamide (polyamide 6,6/6,T/6,I); poly(caprolactam-hexamethylene terephthalamide) (polyamide 6/6,T); and hexamethylene terephthalamide/hexamethylene isophthalamide (6,T/6,I) copolymer.

An especially preferred semiaromatic polyamide for the invention is hexamethylene terephthalamide/2-methylpentamethylene terephthalamide copolyamide (polyamide 6,T/D,T). This polyamide is commercially available as Zytel® HTN501 available from E.I. du Pont de Neumours, Wilmington, Del.

The semiaromatic polyamide component (a) is present in the composition in about 10 to 79.9 wt %, or more preferably in about 15 to about 50 wt %, where the weight percentages are based on the total weight of the thermoplastic composition.

The thermal conductive filler useful in the invention is not particularly limited so long as the thermally conducting filler has a thermal conductivity of at least 5 W/mK and preferably at least 10 W/mK. Useful thermally conductive fillers are selected from the group consisting of oxide powders, flakes and fibers composed of aluminum oxide (alumina), zinc oxide, magnesium oxide and silicon dioxide; nitride powders, flakes and fibers composed of boron nitride, aluminum nitride and silicon nitride; metal and metal alloy powders, flakes and fibers composed of gold, silver, aluminum, iron, copper, tin, tin base alloy used as lead-free solder; carbon fiber, graphite flakes or fibers; silicon carbide powder; and calcium fluoride powder; and the like. These fillers may be used independently, or a combination of two or more of them may be used. Preferred thermally conducting fillers are selected from the group consisting of zinc oxide, magnesium oxide, boron nitride, graphite flakes or fibers, calcium fluoride powder, and zinc sulfide; and an especially preferred thermally conducting filler is calcium fluoride powder.

Thermally conductive fillers can have a broad particle size distribution. If the particle diameter of the filler is too small, the viscosity of the resin may increase during blending to the extent that complete dispersion of the filler can not be accomplished. As a result, it may not be possible to obtain resin having high thermal conductivity. If the particle diameter of the filler is too large, it may become impossible to inject the thermally conductive resin into thin portions of the resin injection cavity, especially those associated with heat radiating members. Preferably, the maximum average particle size is less than 300 microns, and more preferably, less than 200 microns; as measured by using laser-diffraction type particle diameter distribution with a Selas Granulometer "model 920" or a laser-diffraction scattering method particle diameter distribution measuring device "LS-230" produced by Coulter K.K., for instance. Preferably, the average particle size is between 1 micron to 100 microns, and more preferably, between 5 microns to 60 microns. The particles or granules which have multi-modal size distribution in their particle size can also be used. An especially preferred thermally conductive filler is calcium fluoride having a particle size of from about 1 to 100 microns and preferably about 5 to about 60 microns.

The surface of the thermally conductive filler, or a filler having a thermal conductivity less than 5 W/mK (as disclosed below), can be processed with a coupling agent, for the purpose of improving the interfacial bonding between the filler surface and the matrix resin. Examples of the coupling agent include silane series, titanate series, zirconate series, aluminate series, and zircoaluminate series coupling agents.

Useful coupling agents include metal hydroxides and alkoxides including those of Group IIIa thru VIIIa, Ib, IIb, IIIb, and IVb of the Periodic Table and the lanthanides. Specific coupling agents are metal hydroxides and alkoxides of metals selected from the group consisting of Ti, Zr, Mn, Fe, Co, Ni, Cu, Zn, Al, and B. Preferred metal hydroxides and alkoxides are those of Ti and Zr. Specific metal alkoxide coupling agents are titanate and zirconate orthoesters and chelates including compounds of the formula (I), (II) and (III):

$M(OR)_4$ (I)

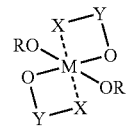
(II)

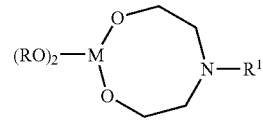
(III)

wherein
M is Ti or Zr;
R is a monovalent $C_1$-$C_8$ linear or branched alkyl;
Y is a divalent radical selected from —CH(CH$_3$)—, —C(CH$_3$)=CH$_2$—, or —CH$_2$CH$_2$—;
X is selected from OH, —N(R$^1$)$_2$, —C(O)OR$^3$, —C(O)R$^3$, —CO$_2^-$A$^+$; wherein
R$^1$ is a —CH$_3$ or C$_2$-C$_4$ linear or branched alkyl, optionally substituted with a hydroxyl or interrupted with an ether oxygen; provided that no more than one heteroatom is bonded to any one carbon atom;
R$^3$ is C$_1$-C$_4$ linear or branched alkyl;
A$^+$ is selected from NH$_4^+$, Li$^+$, Na$^+$, or K$^+$.

The coupling agent can be added to the filler before mixing the filler with the resin, or can be added while blending the filler with the resin. The additive amount of coupling agent is preferably 0.1 through 5 wt % or preferably 0.5 through 2 wt % with respect to the weight of the filler. Addition of coupling agent during the blending of filler with the resin has the added advantage of improving the adhesiveness between the metal used in the joint surface between the heat transfer unit or heat radiating unit and the thermally conductive resin.

The content of the thermally conductive filler in the thermoplastic composition is in a range of 20 to 80 wt %, and preferably 20 to 60 wt %, where the weight percentages are based on the total weight of the thermoplastic composition.

Hyperbranched Polyesteramides useful in the invention are those obtainable by reaction between: a) at least one amino diol formula (IV):

HO—R$^4$—NH—R$^5$—OH (IV)

wherein R$^4$ and R$^5$ are the same or different, and are a divalent organic group having 2-20 carbon atoms; wherein the organic group may be interrupted by 1-10 oxygen atoms; wherein no two oxygens atoms are bound to the same carbon atom; and (b) at least one anhydride selected from the group consisting succinic anhydride, C$_1$-C$_6$ alkyl-substituted succinic anhydrides, phthalic anhydride, C$_1$-C$_6$ alkyl-substituted phthalic anhydrides, 1,2-cyclohexane dicarboxylic anhydride, C$_1$-C$_6$ alkyl-substituted-1,2-cyclohexane dicarboxylic anhydride.

Examples of suitable amino diols are diethanolamine, diethanolamine, dipropanolamine, diisopropanolamine, dibutanolamine, bis(2-hydroxy-1-butyl)amine, and dicyclohexanolamine. Diisopropanolamine is a preferred amino diol for polyesteramides useful in the invention.

One embodiment of the invention is a thermoplastic composition wherein the hyperbranched polyesteramide has repeat units selected from one or more amino diols selected from the group diethanolamine, diethanolamine, dipropanolamine, diisopropanolamine, dibutanolamine, bis(2-hydroxy-1-butyl)amine, and dicyclohexanolamine; and one or more anhydrides selected from the group succinic anhydride and phthalic anhydride. Another embodiment is wherein the hyperbranched polyesteramide has repeat units diisopropanolamine and succinic anhydride.

The synthesis of polyesteramides useful in the invention is disclosed in U.S. Pat. No. 6,387,496 and the related publication WO1999016810(A1), hereby incorporated by reference. The polycondensation is suitably carried out without a catalyst at temperatures between 100 and 200° C. By carrying out such polycondensation compounds will be obtained having amide-type nitrogen moieties as branching points and with hydroxyalkylamide end groups in the polyesteramide.

The hydroxyalkylamide end group functionality in the polyesteramide is generally between 2 and 250 and preferably between 5 and 50 per molecule. Functionality is the average number of reactive groups of the specific type per molecule in the polymer composition. According to a preferred embodiment of the invention the hydroxyalkylamide functionality of the polymer is above 2, more preferably above 2.5, yet more preferably above 3, even more preferably above 4, and most preferably above 5.

Examples of polyesteramides that may be used herein include compounds sold under the trade name TOPBRANE®, which are commercially available from DSM. Specific example of TOPBRANE® hyperbranched polyesteramide that are commercially available are S1 (based on diisopropanolamine and succinic anhydride, Mn=1200, Tg=40-50'C) and P4 (based on diisopropanolamine, succinic anhydride and phthalic anhydride, Mn=1300, Tg not detected).

The content of the hyperbranched polyesteramide in the thermoplastic composition is in a range of 0.1 to 10 wt %, and preferably 0.3 to 2 wt %, where the weight percentages are based on the total weight of the thermoplastic composition.

One aspect of the invention is a thermoplastic composition comprising components (a), (b) and (c) as defined above, wherein the thermoplastic composition has a melt viscosity at 320° C., as measured as disclosed below; at least 10% lower, and preferably at least 30% lower, than that of a composition comprising components (a) and (b) and no component (c).

The thermoplastic composition can include other fillers, flame retardants, heat stabilizers, viscosity modifiers, weatherability enhancers, and other additives known in the art, according to need. In one embodiment the thermoplastic composition, as disclosed above further comprises component (d) about 15 to about 50 wt % of filler having a thermal conductivity less than 5 W/mK. Fillers for component (d) are selected from the group consisting of glass fiber, glass fiber having a non-circular cross-section, wollastonite, talc, mica, silica, calcium carbonate, glass beads, glass flake, and hollow glass spheres Glass fiber having a non-circular cross section refers to a glass fiber having a major axis lying perpendicular to a longitudinal direction of the fiber and corresponding to the longest linear distance in the cross section. The non-circular cross section has a minor axis corresponding to the longest linear distance in the cross section in a direction perpendicular to the major axis. The non-circular cross section of the fiber may have a variety of shapes including a cocoon-type (figure-eight) shape; a rectangular shape; an elliptical shape; a semielliptical shape; a roughly triangular shape; a polygonal shape; and an oblong shape. As will be understood by those skilled in the art, the cross section may have other shapes. The ratio of the length of the major axis to that of the minor access is preferably between about 1.5:1 and about 6:1. The ratio is more preferably between about 2:1 and 5:1 and yet more preferably between about 3:1 and about 4:1. Suitable glass fiber having a non-circular cross section are disclosed in EP 0 190 001 and EP 0 196 194. The glass fiber may be in the form of long glass fibers, chopped strands, milled short glass fibers, or other suitable forms known to those skilled in the art.

Fillers for component (d) are preferably selected from the group consisting of glass fiber, glass fiber having a non-circular cross section, and a combination thereof.

The thermoplastic composition useful in the invention can be made by methods well known in the art for dispersing fillers and other additives with thermoplastic resins such as, for example, single screw extruder, a twin screw extruder, a roll, a Banbury mixer, a Brabender, a kneader or a high shear mixer.

The composition of the present invention may be formed into articles using methods known to those skilled in the art, such as, for example, injection molding. Such articles can include those for use in electrical and electronic applications, mechanical machine parts, and automotive applications. Articles for use in applications that require high thermal conductivity and low moisture absorption are preferred. An embodiment of the invention is a molded article provided by the thermoplastic composition, and preferred embodiments, as disclosed.

The thermoplastic compositions of the invention are especially useful in the electrical/electronics area. For instance they can be used in applications such as hybrid electric motors, stators, connectors, coil formers, motor armature insulators, light housings, plugs, switches, switchgear, housings, relays, circuit breaker components, terminal strips, printed circuit boards, and housings for electronic equipment.

Materials

Zytel® HTN 501 resin is a polyamide 6,T/D,6 copolymer, available from E.I. du Pont de Neumours, Wilmington, Del.

FE3218 resin is polyamide 6,6, available from E.I. du Pont de Neumours, Wilmington, Del.

2,6-NDA refers to 2,6-napthalene dicarboxylic acid.

HBPEA-1 refers to Topbrane® 51 resin, available from DSM.

HBPEA-2 refers to Topbrane® P4 resin, available from DSM.

GF refers to glass fiber FT756D/X, available from Owens Corning Japan Ltd. Tokyo, Japan.

Flat GF refers to CSG 3PA-8205, available from Nitto Boseki Co., Ltd.

CaF2 refers to Calcium fluoride powder with an average size 30 microns manufactured by Sankyo Seifun Co., Ltd.

Staphiloid IM-203 refers to epoxy modified core-shell rubber having 0.3 μm of primary particle size manufactured by GANZ CHEMICAL Co.,Ltd. Talc 1% Aminosilane coated talc, trade name: Kosap #10 (Nippon talc Co., Ltd)

Ultranox 626A refers to bis(2,4-di-tert-butylphenyl pentaerythritol) diphosphite. AO-80 refers to hindered phenol based antioxidant: (Asahi Denka Co.) CS-8CP refers to calcium montanate (NITTO KASEI KOGYO Co.,Ltd) Boltron® H3O dendritic polyester polymer with hydroxyl end groups was obtained from Perstorp Specialty Chemicals, Perstorp, Sweden. TRX 301, an ethylene/propylene/hexadiene terpolymer grafted with 2.1% maleic anhydride, was purchased from Dow Chemical (Midland, Mich., USA).

Compounding and Molding Methods

The polymeric compositions shown in Table 1 were prepared by compounding in a 32 mm ZSK twin screw extruder. All ingredients were blended together and added to the rear of the extruder except that fibers were side-fed into a downstream barrel. Barrel temperatures were set at about 320° C.

The compositions were molded into ISO test specimens and on an injection molding machine for the measurement of physical properties. Melt temperature was about 25° C. and mold temperatures were about 150° C.

Testing Methods

Melt viscosity (MV) was measured using a Kayeness rheometer. The melt viscosities of the pellets obtained were measured at a shear rate of 1000/second and at a temperature of 320° C. after a residence time of 5 min and 10 min, respectively, in each example.

Spiral flow was measured by injection molding of the thermoplastic composition using an injection molding machine (SE30D, manufactured by Sumitomo Co., Ltd.) with an injection pressure of 40 MPa or 80 MPa, an injection rate of 150 mm/sec, and a thickness of 0.3 mm at a melt temperature of 325° C. and mold temperature of 130° C. or 150° C.

Weight loss was measured by thermogravimetric analysis (TGA). TGA was conducted on an Auto TGA 2950 V5.4A instrument (TA Instruments). In each case, a 15-30 mg sample (cut from pellet) was positioned in aluminum pans. The temperature was increased at 20° C./min from 23° C. to 325° C. and then held at 325° C. for 10 min or at 320° C. for 10 min. Samples were run in air or nitrogen atmosphere as indicated in Table 2. At the end of that period the weight loss was measured in weight % relative to the initial weight.

Moisture absorption was measured by immersion of a multi-purpose test bar (ISO3167) in boiling water in a round bottom flask equipped with a condenser. The saturation of moisture absorption was indicated when the weight of test bar remained unchanged. The test sample was removed from the boiling water and a paper towel used to remove the excess water from the surface of the test bar The moisture absorption was calculated as follows:

Moisture absorption=$[W_{after}-(W_{initial}-W_{initial}\cdot\text{Moisture }\%_{initial})]/(W_{initial}\cdot\text{Moisture }\%_{initial})\cdot 100\%$ $W_{after}$: weight after moisture saturation
$W_{initial}$: initial weight before measurement
Moisture $\%_{initial}$: moisture content at initial weight Tensile strength and elongation were measured on samples dry-as-molded (DAM) using the ISO 527-1/2 standard method.

Tensile strength and elongation after air-oven ageing (AOA) were evaluated by the retention of tensile properties after the air oven ageing test at 160° C. for 1,000 hours. The test bars of each sample were exposed to air in an oven for 1,000 hours at 160° C. Before tensile measurement, the test bars were stored in the aluminum bag to prevent moisture absorption. The tensile strength and tensile elongation of the bars were then measured (ISO527-1/2) and compared with that of control bars made from the same material that were tested as dry as molded.

Tensile strength and elongation after moisture absorption test were evaluated by the retention of tensile properties after moisture absorption test as disclosed above. After moisture absorption test, the test bar of each sample was dried with paper towel to remove excess water from the surface.

Before tensile measurement, the test bars were stored in the aluminum bag to prevent the moisture from evaporating. The tensile strength and tensile elongation of the bars were then measured (ISO527-1/2) and compared with that of control bars made from the same material that were tested as dry as molded.

EXAMPLES

Comparative Examples C-1-C-6 and Examples 1-7 are listed in Tables 1 and 2. Examples 1-6 indicate the presence of HBPEAs provide significant reductions in melt viscosities and increases in spiral flow rates; relative to comparative example C-1, having no HBPEA present.

Comparative Example C-2 demonstrates that conventional additives to modify melt viscosity, such as addition of an organic dicarboxylic acid, reduces melt viscosity. However C-2 shows significantly lower spiral flow than that provided by the examples.

Comparative Example C-3 demonstrates that a conventional additive such as polyamide 6,6 reduces melt viscosity; but leads to high moisture absorption.

Comparative Example C-5 demonstrates the affect of a hyperbranched polyester (HBPE), disclosed in European Patent 0902803, as a compatibilizer and viscosity modifier. Comparative Example C-4 is a blend of semi-aromatic polyamide and aliphatic polyamide having no HBPE present, as a control. Comparative Example C-5 is of similar composition to C-4, but further containing 1 wt % Boltorn®H30 HBPE resin. The data indicate that C-5 shows a reduction in viscosity; but surprisingly, very high weight loss under TGA conditions (3.53%) versus the C-4 control (0.7 wt %). Additionally, the compounding of C-5 in a 32 mm twin screw extruder exhibited very significant out-gassing as compared to C-4.

Examples 1-6 provide thermoplastic compositions that have a combination of high loading of thermally conductive filler, low melt viscosity, low moisture absorption, and good thermal stability, not achievable in formulations using conventional viscosity reduction methods; and, surprisingly, not achievable even with known hyper-branched polyesters.

Comparative Example C-6 demonstrates the affect of a hyperbranched polyester (HBPE), disclosed in European Patent 0902803, versus HBPEAs used in compositions of the invention. Comparative Example C-6 used Boltorn® H30 HBPE as a viscosity modifier in the presence of flat glass fiber reinforcing agent. Example 7 used HBPEA-2 as a viscosity modifier; all other components being equivalent to the Comparative Example C-6. Example 7 exhibits significantly lower melt viscosity than C-6; and the TGA weight losses are slightly better in $N_2$ and better in air than C-6.

TABLE 1

| Example | C-1 | C-2 | C-3 | 1 | 2 | 3 | 4 | 5 | 6 | C-4 | C-5 | C-6 | 7 |
|---|---|---|---|---|---|---|---|---|---|---|---|---|---|
| Composition (wt %) | | | | | | | | | | | | | |
| Zytel ®HTN501 | 26.3 | 25.80 | 18.08 | 24.98 | 25.64 | 25.97 | 24.98 | 25.64 | 25.97 | 23.91 | 23.91 | 18.98 | 18.98 |
| PA 6,6 | | | 7.70 | | | | | | | 10.16 | 9.16 | | |
| 2,6-NDA | | 0.50 | 0.52 | | | | | | | 0.83 | 0.83 | | |
| HBPEA-1 | | | | 1.32 | 0.66 | 0.33 | | | | | | | |
| HBPEA-2 | | | | | | | 1.32 | 0.66 | 0.33 | | | | 0.80 |
| Boltorn ® H30 | | | | | | | | | | | 1.00 | 0.80 | |
| TRX-301 | | | | | | | | | | 1.85 | 1.85 | 1.20 | 1.20 |

TABLE 1-continued

| Example | C-1 | C-2 | C-3 | 1 | 2 | 3 | 4 | 5 | 6 | C-4 | C-5 | C-6 | 7 |
|---|---|---|---|---|---|---|---|---|---|---|---|---|---|
| Staphyloid IM-203 | | | | | | | | | | | | 2.40 | 2.40 |
| CaF2 | 53.6 | 53.6 | 53.60 | 53.60 | 53.60 | 53.60 | 53.60 | 53.60 | 53.60 | 34.50 | 34.50 | 33.7 | 33.7 |
| GF | 18.8 | 18.8 | 18.80 | 18.80 | 18.80 | 18.80 | 18.80 | 18.80 | 18.80 | 28.00 | 28.0 | | |
| Flat GF | | | | | | | | | | | | 41.4 | 41.4 |
| talc | 1.00 | 1.00 | 1.00 | 1.00 | 1.00 | 1.00 | 1.00 | 1.00 | 1.00 | 0.40 | 0.40 | 1.00 | 1.00 |
| Ultranox 626A | 0.10 | 0.10 | 0.10 | 0.10 | 0.10 | 0.10 | 0.10 | 0.10 | 0.10 | 0.12 | 0.12 | 0.14 | 0.14 |
| AO-80 | 0.20 | 0.20 | 0.20 | 0.20 | 0.20 | 0.20 | 0.20 | 0.20 | 0.20 | 0.23 | 0.23 | 0.38 | 0.38 |
| CS-8CP | 0.10 | 0.10 | 0.10 | 0.10 | 0.10 | 0.10 | 0.10 | 0.10 | 0.10 | 0.10 | 0.10 | 0.10 | 0.10 |
| Properties | | | | | | | | | | | | | |
| MV, 5 min (Pa·s) | 985.5 | 340.2 | 186.3 | 134.7 | 290.2 | 519.8 | 152.0 | 305.8 | 507.2 | 110 | 59 | 359 | 299 |
| MV, 10 min (Pa·s) | 813.6 | 323.7 | 180.7 | 120.7 | 259.6 | 473.0 | 127.1 | 267.4 | 463.4 | 100 | 69 | | |

TABLE 2

| Example | | C-1 | C-2 | C-3 | 1 | 2 | 3 | 4 | 5 | 6 | C-4 | C-5 | C-6 | 7 |
|---|---|---|---|---|---|---|---|---|---|---|---|---|---|---|
| Spiral flow 150° C., | 40 MPa | | | | 6.5 | 8.7 | | | | | | | | |
| | 80 MPa | | | | 9.6 | 15.6 | | | | | | | | |
| Spiral flow 130° C., | 40 MPa | | 2.81 | | 8.52 | 5.97 | 2.39 | 9.85 | 7.61 | | | | | |
| | 80 MPa | 2.34 | 6.29 | | 15.36 | 8.63 | 6.41 | 14.32 | 11.71 | | | | | |
| Weight loss[a] 325° C., air, (%) | | 0.34 | 0.49 | 0.51 | 0.55 | 0.55 | 0.49 | 0.42 | 0.44 | 0.46 | 0.70 | 3.53 | | |
| Weight loss[a] 320° C., air, (%) | | | | | | | | | | | | | 8.1 | 6.9 |
| Weight loss[a] 320° C., N2 (%) | | | | | | | | | | | | | 0.32 | 0.23 |
| Moisture absorption, % | | | 1.247 | 1.921 | 1.618 | 1.369 | 1.339 | 1.305 | 1.296 | 1.400 | | | | |
| Tensile strength (MPa) | DAM[b] | | 87.6 | 84.7 | 68.1 | 80.6 | 89.6 | 70.2 | 67.9 | 80 | 126 | 116 | 85 | 108 |
| | AOA[c] | | 71 | 74.2 | 60.6 | 69.4 | 74.8 | 62.5 | 61.6 | 63 | 80 | 85 | | |
| | % Retention | | 81 | 88 | 89 | 86 | 84 | 89 | 91 | | 63 | 73 | | |
| | After moisture absorption | | 67.9 | 39.9 | 45.8 | 52.6 | 60.0 | 47.7 | 47.1 | | | | | |
| | % retention | | 78 | 47 | 67 | 65 | 67 | 68 | 69 | 1.30 | | | | |
| Tensile elongation (%) | DAM[b] | | 0.68 | 0.64 | 0.52 | 0.61 | 0.77 | 0.52 | 0.47 | 0.63 | 1.30 | 1.18 | | |
| | AOA[c] | | 0.49 | 0.59 | 0.47 | 0.52 | 0.59 | 0.46 | 0.42 | 48 | 0.63 | 0.73 | | |
| | % Retention | | 72 | 92 | 90 | 85 | 76 | 88 | 89 | | 48 | 62 | | |
| | After moisture absorption | | 0.54 | 1.18 | 0.58 | 0.58 | 0.76 | 0.47 | 0.40 | | | | | |
| | % Retention | | 79 | 183 | 111 | 95 | 98 | 90 | 85 | C-4 | | | | |

[a]TGA
[b]dry as molded
[c]air oven ageing, 160° C., 1000 h

The invention claimed is:

1. A thermoplastic composition comprising:
   a) from about 10 to about 79.9 wt % of at least one semi-aromatic polyamide having a glass transition equal to or greater than 100° C. and a melting point of equal to or greater than 280° C., as determined with differential scanning calorimetry at a scan rate of 20° C./min;
   b) from about 20 to about 80 wt % of a thermally conducting filler having a thermal conductivity of at least 5 W/mK; and
   c) from about 0.1 to about 10 wt % of at least one hyperbranched polyesteramide having terminal hydroxyl groups; and
   wherein said at least one semi-aromatic polyamide is selected from the group consisting of poly(decamethylene terephthalamide), poly(nonamethylene terephthalamide), hexamethylene terephthalamide/2-methylpentamethylene terephthalamide copolyamide; hexamethylene adipamide/hexamethylene terephthalamide/hexamethylene isophthalamide copolyamide; poly(caprolactam/hexamethylene terephthalamide); and hexamethylene terephthalamide/hexamethylene isophthalamide copolymer.

2. The thermoplastic composition of claim 1 wherein said thermally conducting filler is zinc oxide, magnesium oxide, boron nitride, graphite flakes, graphite fibers, calcium fluoride powder, or zinc sulfide.

3. The thermoplastic composition of claim 1 wherein said thermally conducting filler is calcium fluoride.

4. The thermoplastic composition of claim 1 wherein said at least one semi-aromatic polyimide is hexamethylene terephthalamide/2-methylpentamethylene terephthalamide copolyamide.

5. The thermoplastic composition of claim 1 wherein the hyperbranched polyesteramide has repeat units of one or more amino diols selected from the group consisting of diethanolamine, diethanolamine, dipropanolamine, diisopropanolamine, dibutanolamine, bis(2-hydroxy-1-butyl) amine, and dicyclohexanolamine; and one or more anhydrides selected from the group consisting of succinic anhydride and phthalic anhydride.

6. The thermoplastic composition of claim 1 further comprising
   d) about 15 to about 50 wt % of a filler having a thermal conductivity less than 5 W/mK.

7. The thermoplastic composition of claim 6 wherein said filler having a thermal conductivity less than 5 W/mK is selected from the group consisting of glass fiber, glass fiber having a non-circular cross section, and a combination thereof.

8. A molded article comprising the composition of claim 1 or 6.

9. The thermoplastic composition of claim 1, wherein the thermoplastic composition has a melt viscosity at 320° C. that is at least 10% less than a thermoplastic composition comprising the at least one semi-aromatic polyimide and the thermally conducting filler, without the at least one hyperbranched polyesteramide having terminal hydroxyl groups.

10. The thermoplastic composition of claim 9, wherein the melt viscosity is at least 30% less.

* * * * *